United States Patent
Streubel et al.

(10) Patent No.: US 6,240,958 B1
(45) Date of Patent: Jun. 5, 2001

(54) FUEL SUPPLY SYSTEM

(75) Inventors: Wolfgang Streubel, Detmold; Dieter Töpker; Andreas Ewerszumrode, both of Paderborn, all of (DE)

(73) Assignee: Benteler AG, Paderborn (DE)

( * ) Notice: Subject to any disclaimer, the term of this patent is extended or adjusted under 35 U.S.C. 154(b) by 0 days.

(21) Appl. No.: 09/413,152

(22) Filed: Oct. 6, 1999

(30) Foreign Application Priority Data

Oct. 7, 1998 (DE) .................................. 198 46 059

(51) Int. Cl.$^7$ .................................. F02M 33/04
(52) U.S. Cl. .................. 137/588; 123/516; 141/59
(58) Field of Search .................... 137/587, 588; 123/516; 141/59

(56) References Cited

U.S. PATENT DOCUMENTS

| | | | |
|---|---|---|---|
| 3,187,936 | * 6/1965 | Downing | 141/285 X |
| 4,394,925 | * 7/1983 | Rump et al. | 220/86.2 |
| 4,722,454 | * 2/1988 | Fischer | 220/746 |
| 5,076,242 | * 12/1991 | Parker | 123/514 |
| 5,538,039 | * 7/1996 | Harde et al. | 137/592 |
| 5,687,778 | * 11/1997 | Harris | 141/59 |
| 5,704,337 | * 1/1998 | Stratz et al. | 123/516 X |
| 5,964,204 | * 10/1999 | Freeland | 123/516 |
| 5,996,622 | * 12/1999 | Cimminelli et al. | 137/588 |

* cited by examiner

Primary Examiner—John Rivell
(74) Attorney, Agent, or Firm—Friedrich Kueffner

(57) ABSTRACT

A fuel supply system for automobiles with a fuel tank to which are connected a filler pipe and at least one vent for venting the tank during operation of the automobile and one vent for venting the tank during refueling of the tank. The operation vent line and/or the refueling vent line are components of a multiple-duct line. The filler pipe may also be incorporated in the multiple-duct line.

4 Claims, 2 Drawing Sheets

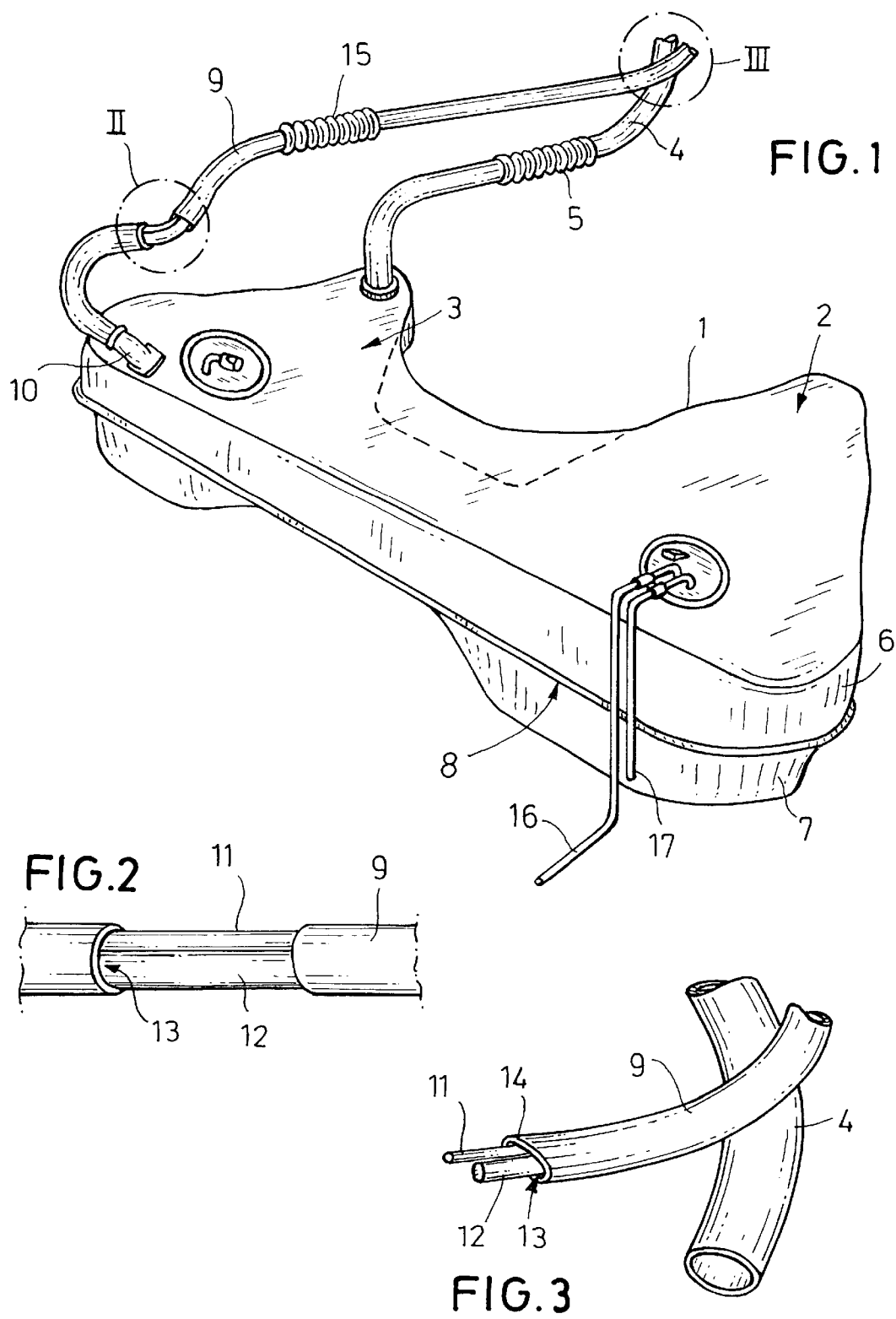

FUEL SUPPLY SYSTEM

BACKGROUND OF THE INVENTION

1. Field of the Invention

The present invention relates to a fuel supply system for automobiles with a fuel tank to which are connected a filler pipe and at least one vent for venting the tank during operation of the automobile and one vent for venting the tank during refueling of the tank.

2. Description of the Related Art

An essential component of a fuel supply system is the fuel tank which contains the fuel needed for supplying the internal combustion engine. Connected to the fuel tank are a filler pipe for refueling and at least one vent for venting the tank during operation and a vent for venting the tank during refueling. Fuel tanks are available as containers of metal and of synthetic material.

The volume of fuel removed from the fuel tank during operation of the internal combustion engine must be replaced by air in order to avoid a pressure difference. This is effected through the operation vent. For this purpose, one or more operation vent lines, such as hoses or pipes, are provided on the fuel tank for connecting the fuel tank to the ambient air. This is usually effected by an activated carbon filter which is mounted in the vent line and neutralizes the gasoline vapors.

In addition to the operation vent, a refueling vent is provided on the fuel tank. This vent composed of one or more lines, such as hoses or pipes, has the purpose of conducting out of the fuel tank the gas volume displaced by the inflowing fuel during refueling. As a rule, the displaced gases are neutralized in an activated carbon filter and are then discharged into ambient air.

In fuel supply systems of the conventional type, the individual operation vent lines and refueling vent lines are located individually outside of the fuel tank. Consequently, a separate connection to the fuel tank with an opening in the wall of the fuel tank is required for each line. Another connection opening is required for the filler pipe. This is cumbersome with respect to manufacturing technology. Moreover, high requirements must be made of the tightness of the connections in order to ensure the operational safety of the fuel supply system.

In addition, the connecting and sealing locations are potential weak points for an escape of fuel gases by permeation, i.e., when fuel gases permeate or diffuse through the sealing material.

This undesired process also occurs at the lines, namely, at the lines for venting during operation and for venting during refueling as well as at the filler pipe. It is disadvantageous in this connection that a large outer surface area of the lines is present through which the gas can diffuse and reach ambient air from the interior of the fuel supply system.

In conventional systems, high-grade materials and complicated sealing systems are used for reducing the permeation of a fuel supply system.

SUMMARY OF THE INVENTION

Therefore, it is the primary object of the present invention to improve a fuel supply system with respect to manufacturing and operational technology, and particularly to prevent permeation.

In accordance with the present invention, the operation vent line and/or the refueling vent line are components of a multiple-duct line.

Consequently, in accordance with the present invention, one or more lines, such as the operation vent line and the refueling vent line, extend together within the multiple-duct line. The multiple-duct line may operate as an operation vent or as a refueling vent.

As a result of the configuration according to the present invention, openings or connection points in the fuel tank and, thus, sealing points are minimized. Consequently, the invention makes it possible to reduce to a single central opening the otherwise necessary individual openings for operation and refueling vent lines.

Another advantage is the fact that less high-grade materials can be used for the lines which are located within the multiple-duct line. A particularly high permeation tightness is not required in these lines. Only the multiple-duct line, whose outer periphery is in direct contact with the environment, must be composed of higher-grade, diffusion-resistant materials. The use of metal pipes is a particular option in this connection.

In accordance with a particularly advantageous embodiment of the basic concept of the present invention, the filler pipe is also incorporated in the multiple-duct line.

As a result of this feature, the number of required openings in the fuel tank is further reduced and the tightness increased.

In accordance with another feature of the present invention, a compensation container is integrated in the multiple-duct line. This compensation container is preferably produced by a radial expansion of the multiple-duct line. This can be carried out in an economical manner by hydraulic shaping.

The compensation container provides a compensation volume for the thermal expansion of the fuel in the fuel tank. Consequently, it is possible to completely fill the fuel tank. In addition to serving as an expansion compensator, liquid or fuel droplets which are conducted or entrained in the volumetric gas flow can be separated in the compensation container.

In accordance with a useful feature, a displacement compensator is integrated in the multiple-duct line. This displacement compensator assumes an uncoupling function. This makes it possible to compensate any displacements occurring during operation, for example, as a result of relative displacements during a crash or through temperature-related length extensions.

The advantages of the invention are particularly significant in those fuel supply systems which include multiple-chamber tanks in which each fuel chamber is equipped with an operation vent.

The function of an operation vent line can also be assumed by the multiple-duct line. In that case, venting takes places through the free cross-section in the annular space between the remaining lines located in the multiple-duct line.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 1 is a perspective view of a fuel supply system;

FIG. 2 is a perspective view, on a larger scale, showing detail II of FIG. 1;

FIG. 3 is a perspective view, also on a larger scale, showing detail III of FIG. 1;

DESCRIPTION OF THE PREFERRED EMBODIMENTS

Figure 5:
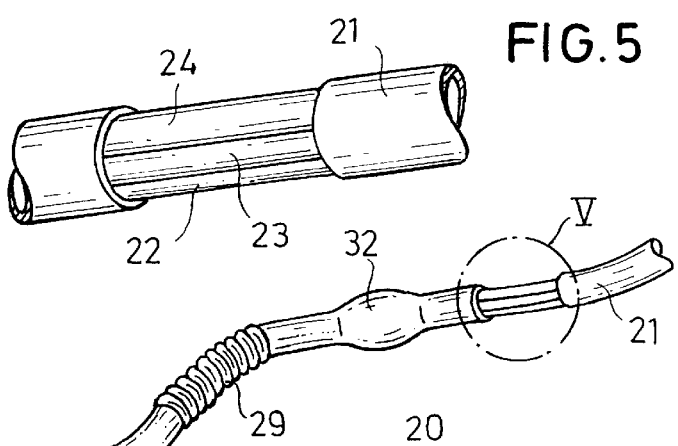
FIG. 5 is a perspective view, on a larger scale, showing detail V of FIG. 4.

FIG. 1 of the drawing shows a fuel supply system with a fuel tank 1 in the form of a so-called multiple-chamber tank, for example, a saddle tank. The fuel tank 1 includes two fuel chambers 2 and 3. Filling of the fuel tank 1 takes place through a filler tube 4 with an integrated expansion compensator 5.

The fuel tank 1 is of metal and is constructed in two pieces with an upper half shell 6 and a lower half shell 7 which are joined together along their abutting edges 8.

Venting of the fuel tank 1 during operation of the automobile and refueling of the tank takes place through a multiple-duct line 9 which leads through a connection 10 into the fuel tank 1. As shown in FIGS. 2 and 3, an operation vent line 11 and a refueling vent line 12 are integrated in the multiple-duct line 9.

The refueling vent line 12 serves to vent the fuel tank 1 during the refueling procedure. In order to take into account the increased gas volume which has to be displaced, the cross-section of the refueling vent line 12 is greater than that of the operation vent line 11. In addition, the refueling vent line serves to limit the filling level of the fuel tank 1. The level or vertical position of the opening of the refueling vent line 12 limits the filling level of the fuel in the fuel tank 1 and a volume which cannot be filled, i.e., compensation volume, is insured in the fuel tank 1.

The operation vent line 11 serves for ventilating and venting the left fuel chamber 2. The right fuel chamber 3 is vented or ventilated through the free cross-section of the multiple-duct line, i.e., the remaining annular space 13 between the operation vent line 11 and the refueling vent line 12, on the one hand, and the inner circumferential surface 14 of the multiple-duct line 9, on the other hand.

A displacement compensator 15 for compensating displacements and length changes during operation is incorporated into the multiple-duct line 9. Also shown in FIG. 1 is a supply line 16 for conducting the fuel to the internal combustion engine and a leakage flow or return flow line 17 for fuel which has not been used.

For the connection 10 of the multiple-line 9, only one opening is required in the fuel tank 1. Consequently, taking place through this opening are the operational venting of the two fuel chambers 2 and 3 through the operation vent line 11 and the multiple-duct line 9 as well as refueling venting by means of the refueling vent line 12.

The multiple-duct line 9 is advantageously of a diffusion-resistant metal. This makes it possible to suppress a permeation of fuel gas. The material of the lines 1 and 12 extending within the multiple-duct line 9, on the other hand, must meet less stringent requirements.

Figure 4:
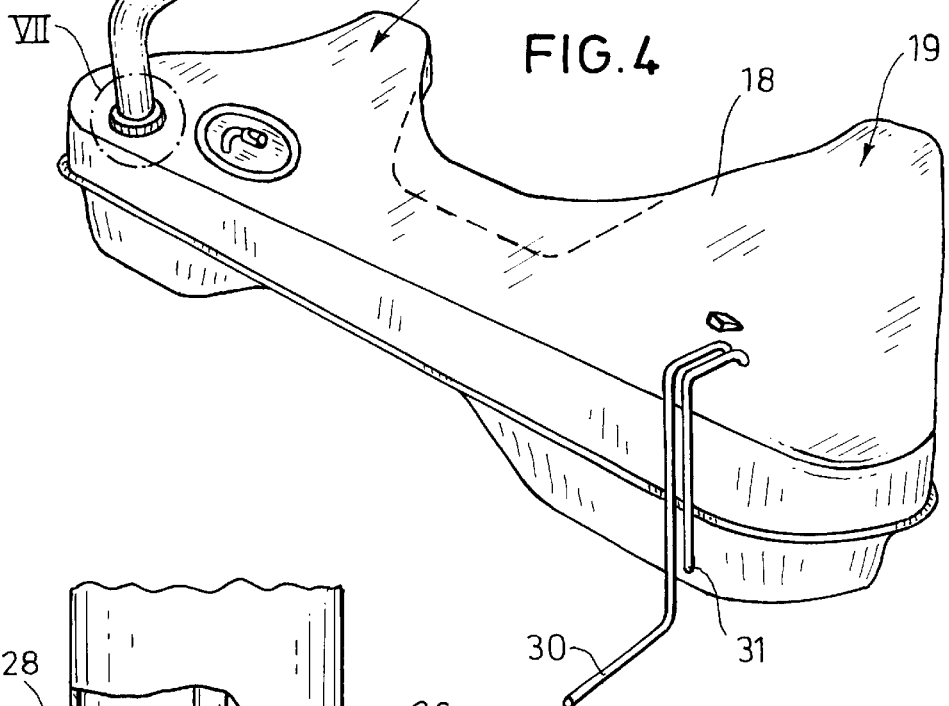
FIG. 4 is a perspective view of a second embodiment of a fuel supply system.

FIG. 4 also shows a fuel tank 18 in the form of a multiple-chamber tank with a left fuel chamber 19 and a right fuel chamber 20.

Figure 6:
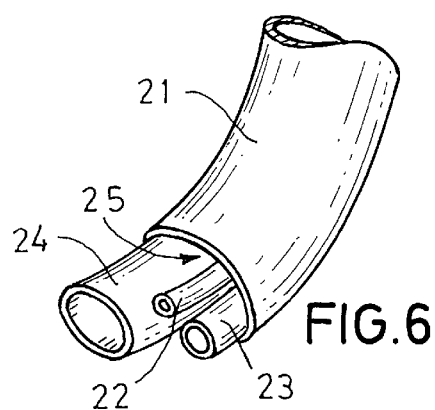
FIG. 6 is a partial perspective view of the multiple-duct line shown in FIG. 4.

Connected to the fuel tank 18 is a multiple-duct line 21 which, in addition to an operation venting line 22 and a refueling vent line 21 also contains a filler pipe 24, as shown in more detail in FIGS. 5 and 6.

Ventilating and venting of the left fuel chamber 19 takes place through the operation vent line 22. Venting of the right fuel chamber 20 takes place through the free cross-section of the multiple-duct line 21 in the annular space 25 between the operation vent line 22, the refueling vent line 23 and the filler pipe 24.

Figure 7:
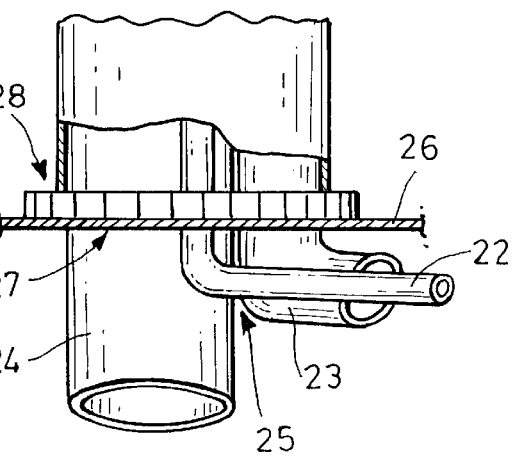
FIG. 7 is an illustration of detail VII of FIG. 4 showing the connection of the multiple-duct line to the fuel tank.

The configuration of the connection of the multiple-duct line 21 to the fuel tank 18 is illustrated in FIG. 7.

Only one opening 27 with a connection 28 for the multiple-duct line 21 is necessary in the wall 26 of the fuel tank 18. The filler pipe 24 as well as the operation vent line 22 and the refueling vent line 23 extend into the fuel tank 21 through the multiple-duct line 21. The multiple-duct line 21 assumes the function of an additional operation vent line 22.

An expansion compensator 29 in the multiple-duct line 21 is shown in FIG. 4. Also shown in FIG. 4 are the supply line 30 and the leakage flow line 31.

Also integrally integrated in the multiple-duct line 21 is a compensation container 32. The compensation container 32 is manufactured preferably as a radial expansion of the wall of the multiple-line duct line 21 produced by hydraulic shaping. The compensation container 32 provides a compensation volume. The compensation container 32 provides the compensation volume for the thermal expansion of the fuel in the fuel tank 18. In addition, any fuel droplets entrained in the volumetric gas flow can be separated in the compensation container 32.

The invention is not limited by the embodiments described above which are presented as examples only but can be modified in various ways within the scope of protection defined by the appended patent claims.

We claim:

1. In a fuel supply system for automobiles with a fuel tank and a filler pipe as well as at least one first vent for venting the fuel tank during operation of the automobile and a second vent for venting the fuel tank during refueling of the fuel tank, wherein the filler pipe and the first and second vents are connected to the fuel tank, wherein the improvement comprises that at least one of the first vent and the second vent is a component of a multiple-duct line, further comprising a compensation container integrated in the multiple-duct line.

2. The fuel supply system according to claim 1, wherein the filler pipe is integrated in the multiple-duct line.

3. In a fuel supply system for automobiles with a fuel tank and a filler pipe as well as at least one first vent for venting the fuel tank during operation of the automobile and a second vent for venting the fuel tank during refueling of the fuel tank, wherein the filler pipe and the first and second vents are connected to the fuel tank, wherein the improvement comprises that at least one of the first vent and the second vent is a component of a multiple-duct line, further comprising an expansion compensator integrated in the multiple-duct line.

4. The fuel supply system according to claim 3, wherein the filler pipe is integrated in the multiple-duct line.

* * * * *